United States Patent
Krohmer et al.

(10) Patent No.: US 6,460,136 B1
(45) Date of Patent: Oct. 1, 2002

(54) METHOD AND APPARATUS FOR LOADING AN OPERATING SYSTEM KERNEL FROM A SHARED DISK MEMORY

(75) Inventors: Gerhard Krohmer, Boise; Gary R. Ackaret, Meridian, both of ID (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/351,376

(22) Filed: Jul. 12, 1999

(51) Int. Cl.[7] .................................................. G06F 9/00
(52) U.S. Cl. ............................... 713/2; 713/1; 709/220; 709/222; 710/10; 710/104
(58) Field of Search ................................. 713/1, 2, 100; 709/220, 221, 222, 450; 711/11, 147, 166, 170; 710/8, 10, 104; 712/15

(56) References Cited

U.S. PATENT DOCUMENTS

| | | | |
|---|---|---|---|
| 4,785,397 A | | 11/1988 | Koizumi et al. ............ 364/200 |
| 4,896,289 A | * | 1/1990 | Svinicki et al. ............. 364/900 |
| 5,379,431 A | * | 1/1995 | Lemon et al. ............... 395/700 |
| 5,410,651 A | * | 4/1995 | Sekizawa et al. ........... 395/200 |
| 5,418,956 A | * | 5/1995 | Willman ...................... 395/700 |
| 5,561,802 A | * | 10/1996 | Orimo et al. ................ 395/700 |
| 5,574,915 A | * | 11/1996 | Lemon et al. ............... 395/700 |
| 5,671,356 A | | 9/1997 | Wang ..................... 395/200.03 |
| 6,021,276 A | * | 2/2000 | Demke et al. ................. 711/11 |
| 6,138,234 A | * | 10/2000 | Lee et al. ....................... 713/2 |
| 6,223,346 B1 | * | 4/2001 | Tock ............................. 717/11 |

* cited by examiner

*Primary Examiner*—Jeffrey Gaffin
*Assistant Examiner*—Rijue Mai

(57) ABSTRACT

The invention enables plural computers to initiate operation of respective operating systems through use of a shared operating system kernel. A system embodying the invention includes a central storage unit (e.g. a disk drive) that includes an operating system kernel, and plural computers, each computer including memory for holding an initiation boot code that enables initial startup of the respective computer upon a power up or a reset. A channel communication link provides circuit connections between the central storage unit and each of the plural computers. Each of the plural computers responds to a power-up or reset action by initiating operation of respective ones of the boot codes. Each boot code, after initiating preliminary operations, performs an access of the operating system kernel from the central storage unit via the channel communication circuit so as to enable a high speed load of the kernel to the respective computer memories. The central storage unit also includes a configuration file that defines data which is utilized to alter the kernel for each particular computer. Each computer, upon downloading the kernel, accesses the configuration file so as to enable determination of which aspects of the kernel require modification for the respective computer.

7 Claims, 2 Drawing Sheets

METHOD AND APPARATUS FOR LOADING AN OPERATING SYSTEM KERNEL FROM A SHARED DISK MEMORY

FIELD OF THE INVENTION

This invention relates to the use of a shared disk drive memory to maintain an operating system kernel for plural processors and, more particularly, to a method for enabling high speed access by the plural processors to the operating system kernel, via a directly connected bus system.

BACKGROUND OF THE INVENTION

An initial program load occurs in a processor when power is first applied or when the processor's reset function is enabled. During the initial program load, "boot" code is accessed from non-volatile storage and typically includes data for configuring the processor, procedures for enabling input/output communications, procedures for performing diagnostic routines and code which enables the loading of further operating system software.

During operation of the boot code, the operating system kernel, that is often stored on disk, is loaded into the processor. Such operating system kernel enables full functionality of the computer to be commenced.

In the prior art, various methods have been proposed to enable an operating system kernel to be loaded from one processor to another so as to avoid the necessity for all processors to store a copy of the operating system kernel. For example, U.S. Pat. No. 4,785,397 to Koizumi et al. describes a system for loading a program in a distributed processing system. In the Koizumi et al. system, a program is transferred from one information processing unit to another via an interconnecting network. Individual information processing units are enabled to selectively access a program from other information processing units via the network.

In U.S. Pat. No. 5,671,356 to Wang, a multinodal network is described wherein only one node in the network includes the "functional" microcode (i.e., an operating system kernel). During power-up, the node with the functional microcode becomes fully operational, whereas other nodes merely execute their boot code and become partially operational. Those nodes then begin requesting transfer of the operating system kernel from adjacent nodes. The node with the fully operational operating system kernel responds to received requests and downloads the operating system kernel to requesting nodes, which in turn, download the operating system kernel to other requesting nodes, etc.

In such prior art, an intelligent server function is required to enable the downloading of the operating system kernel between nodes and to manage the data flow between the nodes and the system having the original copy of the operating system kernel. Such intervention of an intelligent processor delays the downloading of the operating system kernel and adds significant system overhead expense to accomplish the download action.

Accordingly, it is an object of this invention to provide an improved method and apparatus for enabling download of an operating system kernel from a central storage unit to plural client computers.

It is another object of this invention to provide a system wherein multiple client computers are enabled to rapidly download an operating system kernel, without the intervention of other intelligent processing systems.

SUMMARY OF THE INVENTION

The invention enables plural computers to initiate operation of respective operating systems through use of a shared operating system kernel. A system embodying the invention includes a central storage unit (e.g. a disk drive) that includes an operating system kernel, and plural computers, each computer including memory for holding initiation boot code that enables initial startup of the respective computer upon a power up or a reset. A channel communication link provides circuit connections between the central storage unit and each of the plural computers. Each of the plural computers responds to a power-up or reset action by initiating operation of respective ones of the boot codes. Each boot code, after initiating preliminary operations, performs an access of the operating system kernel from the central storage unit via the channel communication circuit so as to enable a high speed load of the kernel to the respective computer memories. The central storage unit also includes a configuration file that defines data which is utilized to alter the kernel for each particular computer. Each computer, upon downloading the kernel, accesses the configuration file so as to enable determination of which aspects of the kernel require modification for the respective computer.

DETAILED DESCRIPTION OF THE INVENTION

Figure 1:
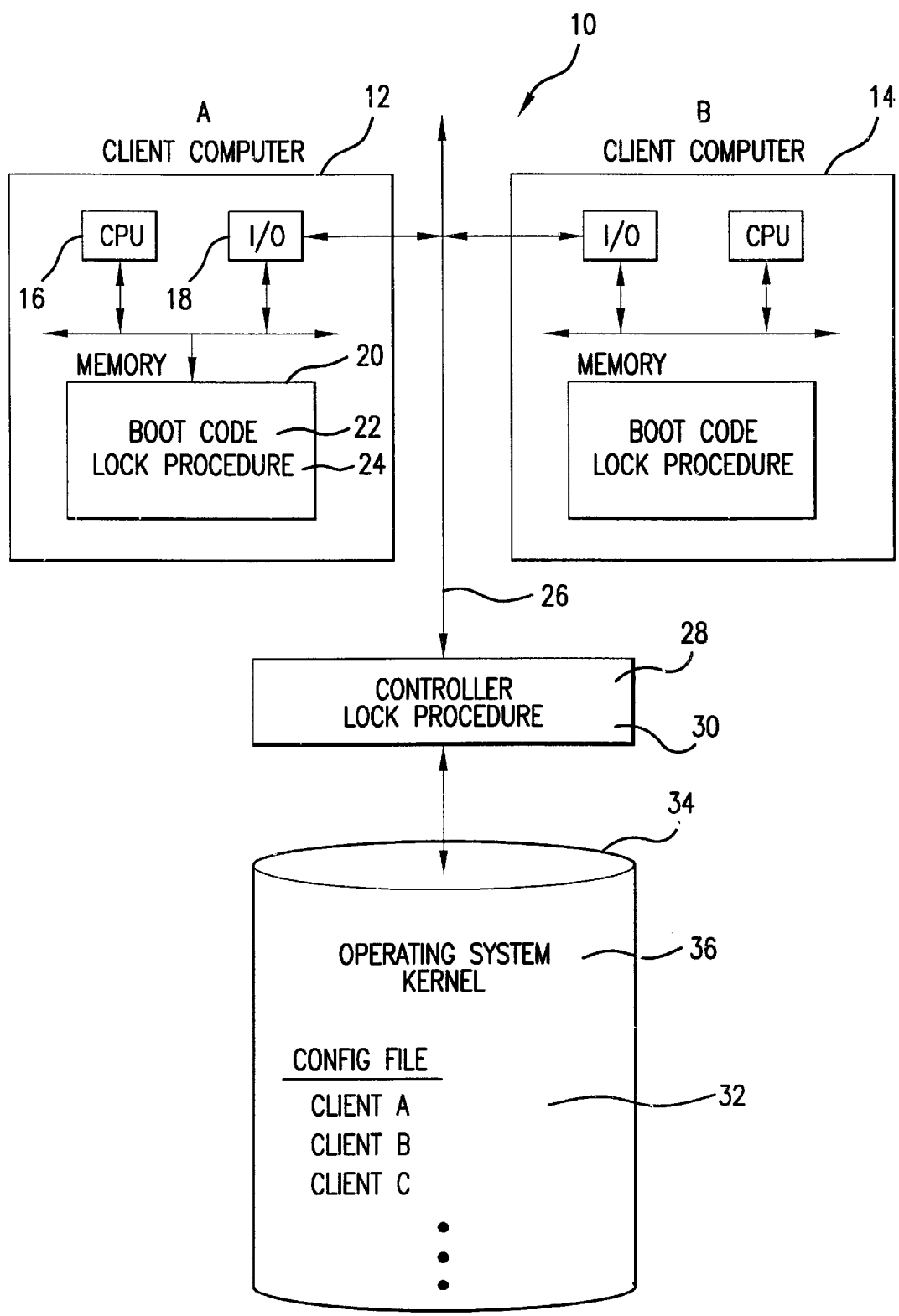
FIG. 1 is a high level block diagram illustrating a system incorporating the invention.

Referring to FIG. 1, system 10 comprises two or more client computers 12 and 14, each of which includes a central processing unit (CPU) 16, an input/output module 18 and a memory 20. Memory 20 includes boot code 22 that enables initial operation of a client computer upon a power up or reset action. Essentially, boot code 22 performs system tests, configures its client computer and enables communications via I/O module 18.

Also contained within memory 20 is a lock procedure 24 whose use will be described hereinbelow in regards to accessing a configuration file that enables an accessed operating system kernel to be configured in accordance with the specific computer to which it is downloaded.

Each of client computers 12 and 14 is coupled via a high speed bus 26 to a controller 28. Bus 26 is preferably configured as a SCSI bus or a fiber channel link. More specifically, bus 26 comprises a direct circuit connection between each I/O module 18 and controller 28. Such a connection enables high speed data transfers between controller 28 and each client computer, without an intervening intelligent processor being required. In essence, bus 26 enables controller 28 to operate as a local disk controller for each of client computers 12, 14, etc.

Controller 28 includes lock procedure 30 (a component of the operating system) which operates in conjunction with lock procedure 24 to assure that only one client computer, at a time, has access to configuration file 32 within disk drive 34. Also contained within disk drive 34 is an operating system kernel 36 which is common to all client computers, 12, 14, etc. In essence, operating system kernel 36 comprises the overall operating system for each of the respective client computers.

The main reason why operating system kernel 36 can be downloaded via controller 28 and bus 26, without intervening intelligent processing apparatus is the fact that most of the actions required in the download action are read operations, with writes being required only very infrequently. Accordingly, when one of client computers 12 or 14 issues a call for operating system kernel 36, a read operation is carried out by controller 28 that enables operating system kernel 36 to be downloaded to the calling client computer. Such download occurs at a high bus transfer rate, via bus 26 to I/O module 18.

Figure 2:
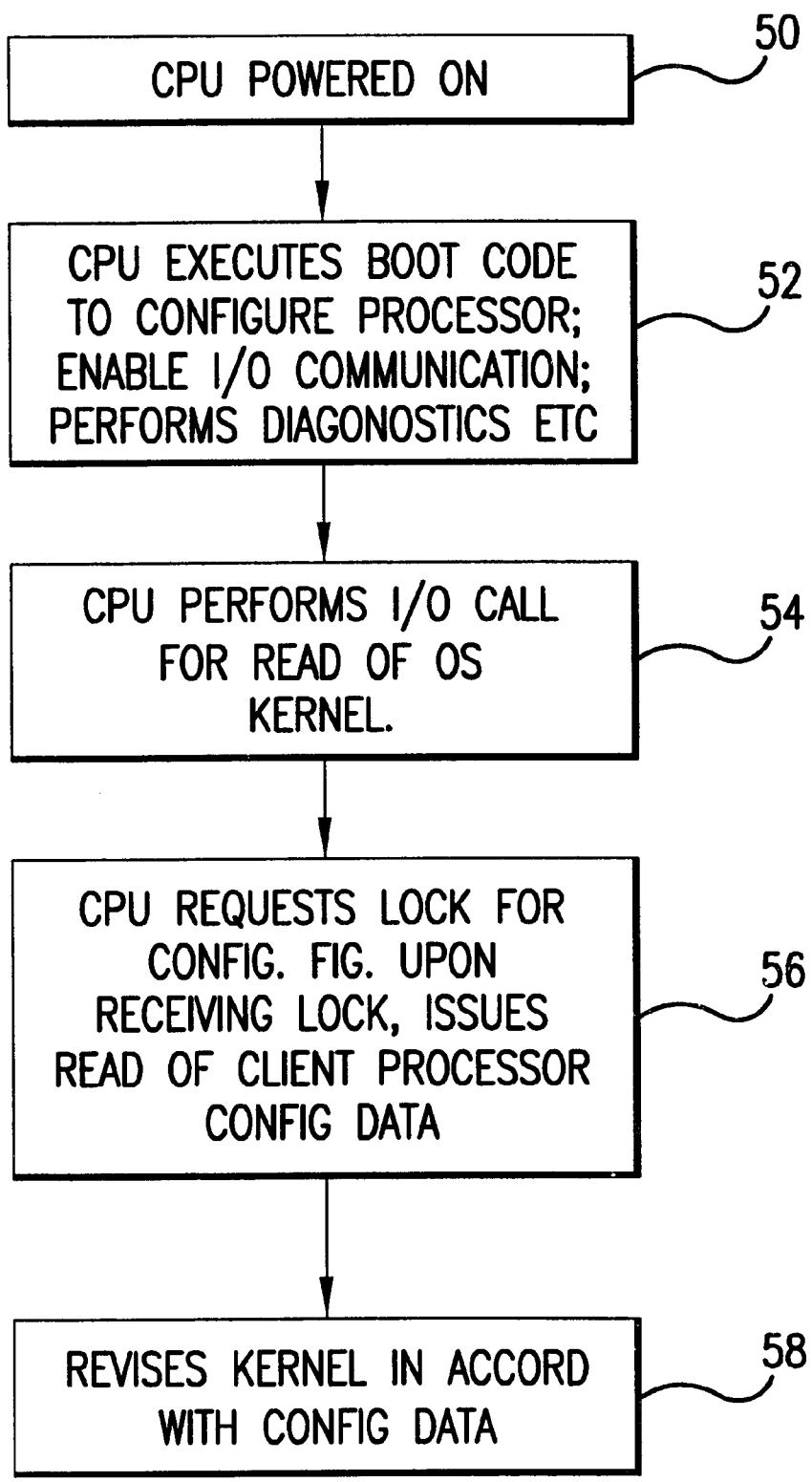
FIG. 2 is a high level logic diagram illustrating the method of the invention.

Turning to FIG. 2, the operation of the system of FIG. 1 will be further described. Initially, it is assumed that client computer 12 is powered on, or reset (step 50). In response, CPU 16 accesses and executes boot code 22 to obtain configuration parameters; to enable the performance of I/O communications; to perform diagnostics, etc. (step 52). Boot code 22 further enables CPU 16 to issue an I/O call to controller 28 for a read of operating system kernel 36 (step 54).

Controller 28 then responds by accessing operating system kernel 36 and dispatching its data, via bus 26, back to I/O module 18. Thereafter, operating system kernel 36 is loaded into memory 20 for further control of client computer 12.

Next, client computer 12 requests a lock for configuration file 32 from controller 28. Upon being granted the lock, (through the action of lock procedure 30), the specific parameters within configuration file 32 that are relevant to client computer 12 may be accessed and fed, via controller 28 and bus 26, back to client computer 12 (step 56). Further, the lock enables the computer that is granted the lock to write to configuration file 32. Thereafter, client computer 12 utilizes the received configuration data to modify operating system kernel 36, which now resides in memory (step 58). Note that when a computer accesses the central storage unit to perform a write action, the locking mechanism restricts access to the configuration file to the computer that undertakes to perform the write action and has been granted the lock.

At this stage, client computer 12 is in condition to operate on an independent basis, using the configured operating system kernel 36 that resides in its memory 20. Note further, that when the kernel is executed, it not only brings up the computer's operating system, but also any utilities that are tied to the operating system.

The use of lock procedures 24 and 30 with respect for configuration file 32 enables one or the other of client computers 12 or 14 to access the configuration file data without fear of an intervening write action occurring which might alter the data.

It is thus to be understood from the description above, that the invention enables a high speed download of operating system kernel to client computers 12 and 14 without requiring each client computer to maintain a copy of operating system kernel 36. Further, the data transfer via bus 26 operates at a high transfer rate and enables disk 34 to appear as though it is a local, integrated disk drive for each of client computers 12 and 14, whereas, in fact, it is or may be remote therefrom and serving plural client computers.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system for enabling a plurality of computers to initiate operation of respective operating systems through use of a shared operating system kernel, said system comprising:

a central storage unit that includes an operating system kernel that is commonly usable by said plural computers;

plural computers, each computer including memory for holding initiation boot code which enables initial start-up of the respective computer upon a power-up or a reset action;

a channel communication link for providing circuit connections between said central storage unit and each of said plural computers; and a processor in each of said plural computers for responding to said power-up or reset action, by initiating operation of respective ones of said boot codes, each said boot code, after initiating preliminary processor operations, performing an access of said operating system kernel from said central storage unit via said circuit connections so as to enable a high speed load of said kernel to said memory from said central storage unit and subsequent independent operation of each of said plural computers.

2. The system as recited in claim 1, wherein said central storage unit further includes a configuration file for each one of said plural computers, and wherein each said processor, upon downloading said operating system kernel, operates said kernel to access the configuration file for the respective computer so as to enable determination of which aspects of said operating system kernel require modification for the respective computer.

3. The system as recited in claim 2, wherein said channel communication link comprises either a SCSI bus system or a fiber channel-based bus system.

4. The system as recited in claim 2, wherein both said central storage unit and each said processor implement a locking mechanism whereby, upon a processor accessing said central storage unit to perform a write action, said locking mechanism is operated and restricts writing to said configuration file to said processor that undertakes to perform the write action and has been granted a lock to said file.

5. A method for enabling a plural computers to initiate operation of respective operating systems through use of a shared operating system kernel stored in a central storage unit, each of said plural computers including memory for holding an initiation boot code that enables initial start-up of the respective computer upon a power-up action and a channel communication link for providing circuit connections between said central storage unit and each of said plural computers, each said computer performing a method comprising:

responding to said power-up action by initiating operation of a respective boot code, said boot code initiating preliminary computer operations; and causing said boot code to access said operating system kernel from said central storage unit via said channel communication link so as to enable a high speed load of said kernel to said computer memory from said central storage unit and subsequent independent operation of each of said plural computers.

6. The method as recited in claim 5, wherein said central storage unit further includes a configuration file for each one of said plural computers, and said method includes the further step of:

upon downloading said kernel from said central storage unit, operating said kernel to access the configuration file for the respective computer so as to enable determination of which aspects of said kernel require modification for the respective computer.

7. The method as recited in claim 6, wherein both said central storage unit and each said computer implement a locking mechanism, said method including the further step of:

upon a computer accessing said central storage unit to perform a write action, operating said locking mechanism to restrict writing to said configuration file to said processor means that undertakes to perform the write action and has been granted a lock to said file.

\* \* \* \* \*